United States Patent [19]

Oberneder et al.

[11] Patent Number: 5,985,994
[45] Date of Patent: Nov. 16, 1999

[54] AQUEOUS DISPERSIONS OF ORGANOPOLYSILOXANES

[75] Inventors: Stefan Oberneder; Karl Braunsperger, both of Burghausen, Germany; Alfred Heinrich, Ach, Austria; Rudolf Braun, Kastl; Herbert Soellradl, Emmerting, both of Germany

[73] Assignee: Wacker-Chemie GmbH, Munich, Germany

[21] Appl. No.: 08/952,134

[22] PCT Filed: May 23, 1996

[86] PCT No.: PCT/EP96/02227

§ 371 Date: Nov. 10, 1997

§ 102(e) Date: Nov. 10, 1997

[87] PCT Pub. No.: WO96/37556

PCT Pub. Date: Nov. 28, 1996

[30] Foreign Application Priority Data

May 24, 1995 [DE] Germany ............... 195 19 207

[51] Int. Cl.⁶ ............ C08L 83/08; C08L 83/05; C08G 77/26
[52] U.S. Cl. ............ 524/864; 524/588; 524/860; 524/863; 528/38; 528/901
[58] Field of Search ............ 524/864, 588, 524/860, 863; 528/38, 901

[56] References Cited

U.S. PATENT DOCUMENTS

| | | |
|---|---|---|
| 3,294,725 | 12/1966 | Findlay et al. . |
| 4,894,412 | 1/1990 | Okada et al. . |
| 5,000,861 | 3/1991 | Yang ........................ 252/8.6 |
| 5,004,771 | 4/1991 | Feder et al. . |
| 5,045,231 | 9/1991 | Braun et al. . |
| 5,140,061 | 8/1992 | Feder ........................ 524/864 |

FOREIGN PATENT DOCUMENTS

| | | |
|---|---|---|
| 1037707 | 8/1958 | Germany . |
| 4217561 | 5/1992 | Germany . |
| 4340400 | 11/1993 | Germany . |

OTHER PUBLICATIONS

U.S. application No. 08/056,088, Braun et al., filed May 27, 1992.
U.S. application No. 08/342,192, Oberneder et al., filed Nov. 26, 1993.
"Ullmann's Encyclopedia of Industrial Chemistry", Urban & Schwarzenberg, Munich, Berlin, 3rd edition, vol. 1, p. 720ff.

*Primary Examiner*—Tae Yoon
*Attorney, Agent, or Firm*—Brooks & Kushman P.C.

[57] ABSTRACT

Aqueous dispersions organopolysiloxanes which are free of organic transition metal compounds and of organic compounds of the metals of the main groups III, IV and V. These dispersions can be produced using the following starting compounds:

(A) organopolysiloxane containing condensation-capable groups;
(B) an organosilicon compound of the formula $$\{[(RO)_3Si-R^3-]_eR^2_{1-e}\}_aSi(OR)_{4-a} \qquad (II),$$

in which

R is identical or different and is a hydrogen atom or alkyl radical having 1 to 6 carbon atoms, $R^2$ is identical or different and is an SiC-bonded hydrocarbon radical having 1 to 18 carbon atoms, optionally substituted with halogen atoms, ether groups, ester groups, epoxy groups, mercapto groups or (poly)glycol radicals comprised of oxyethylene units, oxypropylene units and mixtures thereof $R^3$ is identical or different and is a divalent hydrocarbon radical, a is 0 or 1, and e is 0 or 1 where $\{[(RO)_3Si-R^3-]_eR^2_{1-e}\}_a$ of formula (II) is optionally a partial hydrolyzate having not more than 8 Si atoms;

(C) an organosilicon compound containing basic nitrogen.

16 Claims, No Drawings

AQUEOUS DISPERSIONS OF ORGANOPOLYSILOXANES

The invention relates to aqueous dispersions of organopolysiloxanes which following removal of water can be converted into elastomers, to processes for their preparation and to their use as sealing and coating materials.

Environmental protection measures are increasingly dictating the avoidance of organic solvents in chemical formulations. As a consequence, aqueous systems are finding application more and more.

Aqueous dispersions of organopolysiloxanes per se are widely known. The basic structure of such dispersions, which vulcanize even at room temperature to form elastomers, is composed of a linear polymer, a crosslinking component and a crosslinking catalyst. In general, the initial charge to the reaction vessel is an aqueous emulsion of polydiorganosiloxanes whose end groups contain condensable groups. These high molecular weight polysiloxanes are either emulsified directly or, usually, are prepared in emulsion by customary techniques by polymerization, condensation and equilibration from linear or cyclic, low molecular weight polysiloxanes. The polymer emulsion is then generally mixed with a crosslinking component and condensation catalyst, in each case in bulk or as an emulsion, and with further constituents, such as fillers, adhesion promoters, etc., the catalyst comprising almost exclusively (organo)metallic compounds.

The (organo)metallic catalysts employed virtually without exception as catalysts have the disadvantage that on the one hand they impair both the storage stability of the unvulcanized compositions and the stability of the vulcanized elastomers, and on the other hand they are regarded as toxicologically objectionable. In many of the prior developments, the highly complex, time-consuming and therefore costly preparation of the aqueous emulsions constitutes a disadvantage. These problems result principally from the emulsion polymerization, emulsion condensation or equilibration of the polydiorganosiloxanes to be employed, which takes up reaction time and must be carried out prior to the preparation of the end product by mixing in the other constituents. A further disadvantage of the majority of aqueous emulsions known to date is their low solids content. It is a high solids content, however, which is the precondition for low or insignificant shrinkage during vulcanization, which is desirable for most areas of application.

For example, German Application DE 42 17 561 (Wacker-Chemie GmbH; filed on May 27, 1992) or the corresponding U.S. application having the serial number U.S. Ser. No. 08/056,088 describes aqueous dispersions of organopolysiloxanes, comprising condensable organopolysiloxane, silicone resin, polyvinyl alcohol, (organo)metallic catalyst and amino-functional substances, which dispersions can be used to obtain transparent vulcanizates.

Additionally, U.S. Pat. No. 5,045,231 (Wacker-Chemie GmbH; published on Sep. 3, 1991) or the corresponding DE-A 39 32 025 claims aqueous dispersions of organopolysiloxanes, comprising condensable organopolysiloxanes, (organo)metallic catalysts, organopolysiloxane resins and diorganosilanolates, it being possible for the solids content of the dispersions to be up to 90%.

In DE-B 1037707 (Dow Corning; published on Aug. 28, 1958) a process for the preparation of emulsions of high molecular weight organopolysiloxanes is disclosed which starts from an emulsion of low molecular weight siloxanes. The desired molecular size is achieved with the aid of strongly acidic or alkaline catalysts. These emulsions do not lead to elastomers.

According to U.S. Pat. No. 5,004,771 (Rhone Poulenc; published on Apr. 2, 1990) or in the corresponding EP-A 365 439, the acidic condensation of a terminally OH-blocked polydiorganosiloxane is carried out in aqueous emulsion. After neutralizing the polymer emulsion, the further constituents, such as methylsiliconate solution and nonsiliceous fillers, but not compounds containing basic nitrogen, are added. The emulsions described, which have a solids content of less than 90%, do not give rise to elastomers.

U.S. Pat. No. 4,894,412 (Shin-Etsu Chemical Co. Ltd.; published on Jan. 16, 1990) describes a process for the preparation of textile coatings. The low-solids polysiloxane emulsion concerned comprises organosilicon component, amino-functional siloxane and organosilanes. The process described comprises an emulsion polymerization and subsequent neutralization. The dispersion obtained is applied in a thin coat to textiles and vulcanized with heating, for example at 105° C. for 3 hours.

Furthermore, the German application bearing the file reference P 43 40 400.6 (Wacker-Chemie GmbH; filed on Nov. 26, 1993) or the corresponding U.S. application with the serial number U.S. Ser. No. 08/342,192 describes aqueous dispersions comprising condensable organopolysiloxane, low molecular weight silicon resin and a compound containing basic nitrogen, which dispersions are free from organic transition metal compounds.

The invention provides aqueous dispersions of organopolysiloxanes, which are free from organic transition metal compounds and organic compounds of metals of main groups III, IV and V, and which can be prepared using the following starting materials:

(A) organopolysiloxane containing condensable groups,
(B) organosilicon compound of the formula

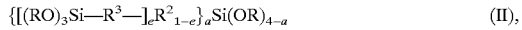

in which
each R can be identical or different and is a hydrogen atom or alkyl radical having 1 to 6 carbon atoms,
each $R^2$ can be identical or different and is an SiC-bonded hydrocarbon radical having 1 to 18 carbon atoms which is unsubstituted or substituted with halogen atoms, ether groups, ester groups, epoxy groups, mercapto groups, cyano groups or (poly)glycol radicals, the latter being composed of oxyethylene and/or oxypropylene units, and
each $R^3$ can be identical or different and is a divalent hydrocarbon radical,
a is 0 or 1 and
e is 0 or 1,
and/or partial hydrolyzates thereof having not more than 8 Si atoms, and
(C) organosilicon compound containing basic nitrogen.

Metals from main groups III, IV and V of the Periodic Table are intended in the context of the present invention to embrace aluminum, gallium, indium, thallium, germanium, tin, lead, antimony and bismuth.

In the context of the present invention, the term "condensable" is intended to include any preceding hydrolysis.

The organopolysiloxanes (A) containing condensable groups that are employed in accordance with the invention are preferably those of the formula

in which each $R^1$ is an identical or different SiC-bonded hydrocarbon radical having 1 to 18 carbon atoms which is unsubstituted or substituted with halogen atoms, ether groups, ester groups, epoxy groups, mercapto groups, cyano groups or (poly)glycol radicals, the latter being composed of oxyethylene and/or oxypropylene units, and n is an integer of at least 30.

Examples of hydrocarbon radicals $R^1$ are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical; hexyl radicals, such as the n-hexyl radical; heptyl radicals, such as the n-heptyl radical; octyl radicals, such as the n-octyl radical and isooctyl radicals such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical, the α- and the β-phenylethyl radical.

Examples of substituted hydrocarbon radicals $R^1$ are halogenated radicals such as the 3-chloropropyl radical, the 3,3,3-trifluoropropyl radical, chlorophenyl radicals, hexafluoropropyl radicals, such as the 1-trifluoromethyl-2,2,2-trifluoroethyl radical; the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical, the perfluoroisopropyloxypropyl radical; ether-functional radicals, such as the 3-methoxypropyl radical and the 3-ethoxypropyl radical; cyano-functional radicals, such as the 2-cyanoethyl radical; ester-functional radicals, such as the methacryloxypropyl radical; epoxy-functional radicals, such as the glycidyloxypropyl radical, and sulfur-functional radicals, such as the 3-mercaptopropyl radical.

Preferred radicals $R^1$ are hydrocarbon radicals having 1 to 10 carbon atoms with particularly preferably at least 80%, in particular at least 90%, of the radicals $R^1$ being methyl radicals.

The average value for the number n in formula (I) is preferably chosen such that the organopolysiloxane of the formula (I) has a viscosity of more than 1000 mm²/s, particularly preferably more than 10,000 mm²/s, in particular about 80,000 mm²/s, measured in each case at a temperature of 25° C.

Although not indicated in formula (I), up to 10 mol percent of the diorganosiloxane units may be replaced by other siloxanes, although these other units are usually present only as impurities which are more or less difficult to avoid, such as $R^1{}_3SiO_{1/2}$, $R^1SiO_{3/2}$ and $SiO_{4/2}$ units, in which $R^1$ is as defined above.

The polydiorganosiloxanes of formula (I) can be prepared by methods which are known in the technical field, for example by polymerization or condensation of low molecular weight cyclic or linear organopolysiloxanes which are terminally hydroxyl- and/or alkoxy-blocked.

The organopolysiloxane (A) containing condensable groups which is employed in accordance with the invention may comprise one single type or else a mixture of at least two types of such organopolysiloxanes containing condensable groups.

The organosilicon compound of the formula (II) may be a silane of the formula

and a compound of the formula

where R, $R^2$, $R^3$ and a are as defined above.

Examples of the radical $R^2$ are those given for $R^1$, where hydrocarbon radicals having 1 to 18 carbon atoms are preferred and particular preference is given to methyl, ethyl, vinyl and phenyl radicals, especially methyl radicals.

Preferred radicals R are hydrogen atom and alkyl groups having 1 to 4 carbon atoms, with methyl and ethyl radicals being particularly preferred.

Radical $R^3$ preferably comprises divalent hydrocarbon radicals having 1 to 6 carbon atoms, for example the methylene, ethylene, propylene and butylene radicals, with ethylene and propylene radicals being particularly preferred.

Examples of the organosilicon compound (B) employed in accordance with the invention are methyltrimethoxysilane, methyltriethoxysilane, vinyltrimethoxysilane, vinyltriethoxysilane, phenyltrimethoxysilane, phenyltriethoxysilane, tetraethoxysilane, tetrapropoxysilane, methacryloxypropyltrimethoxysilane and $(C_2H_5O)_3Si—CH_2CH_2—Si(OC_2H_5)_3$ and the partial hydrolyzates thereof having not more than 8 silicon atoms, for instance hexaethoxydisiloxane, with preference being given to methyltrimethoxysilane, methyltriethoxysilane, vinyltrimethoxysilane, vinyltriethoxysilane and tetraethoxysilane and the partial hydrolyzates thereof having not more than 6 silicon atoms.

Component (B) particularly preferably comprises pure silanes of the formula (II') and mixtures of silanes of the formula (II') and partial hydrolyzates thereof having not more than 6 silicon atoms, with a proportional partial hydrolyzate of not more than 90 percent by weight, particularly preferably of not more than 50 percent by weight, based in each case on the weight of the silane/partial hydrolyzate mixture.

For the preparation of the aqueous dispersions of organopolysiloxanes, according to the invention, organosilicon compound (B) is employed in quantities of preferably from 0.01 to 50 parts by weight, particularly preferably from 0.1 to 20 parts by weight, in particular from 0.1 to 5 parts by weight, based in each case on 100 parts by weight of organopolysiloxane (A) containing condensable groups.

The organosilicon compound (B) employed in accordance with the invention may comprise one single type or else a mixture of at least two types of such organosilicon compounds.

The compounds (C) containing basic nitrogen which are employed in accordance with the invention are preferably those comprising units of the formula

in which each $R^4$ can be identical or different and is a monovalent, SiC-bonded organic radical which is free from basic nitrogen, each $R^5$ can be identical or different and is a hydrogen atom, alkyl radical, alkali metal cation, ammonium or phosphonium group, each Y can be identical or different and is a monovalent, SiC-bonded radical containing basic nitrogen, b is 0, 1, 2 or 3, c is 0, 1, 2, 3 or 4 and d is 0, 1, 2, or 3, with the proviso that the sum of b, c and d is less than or equal to 4 and that at least one radical Y is present per molecule.

Radical $R^4$ preferably comprises hydrocarbon radicals having 1 to 18 carbon atoms, with particular preference being given to the methyl, ethyl and propyl radicals, especially the methyl radical.

Examples of the radical $R^4$ are the examples of hydrocarbon radicals given for $R^1$.

Radical $R^5$ preferably comprises hydrogen atom, methyl radical, ethyl radical and alkali metal cation, with particular preference being given to hydrogen atom, methyl radical, ethyl radical, sodium cation and potassium cation.

Examples of radical $R^5$ are the hydrocarbon radicals given for radical R, the cations of the alkali metals, such as those of lithium, sodium, potassium, rubidium and cesium, and also radicals of the formula $$^+NR^6_4 \quad \quad (V)$$

or $$^+PR^6_4 \quad \quad (VI),$$

in which each $R^6$ can be identical or different and is a hydrocarbon radical having 1 to 6 carbon atoms.

The radicals Y are preferably radicals of the formula $$R^7_2NR^8— \quad \quad (VII),$$

in which each $R^7$ can be identical or different and is hydrogen, alkyl, cycloalkyl or aminoalkyl radical and $R^8$ is a divalent hydrocarbon radical.

The examples of alkyl and cycloalkyl radicals $R^1$ apply in their full scope to alkyl or cycloalkyl radicals $R^7$, respectively, as well.

In the radicals of the formula (VII) there is preferably at least one hydrogen atom attached to each nitrogen atom.

Radical $R^8$ preferably comprises divalent hydrocarbon radicals having 1 to 10 carbon atoms, particularly preferably 1 to 4 carbon atoms, especially the n-propylene radical.

Examples of radical $R^8$ are the methylene, ethylene, propylene, butylene, cyclohexylene, octadecylene, phenylene and butenylene radicals.

Examples of radicals Y are
$H_2N(CH_2)_3—$,
$H_2N(CH_2)_2NH(CH_2)_2—$,
$H_2N(CH_2)_2NH(CH_2)_3—$,
$H_2N(CH_2)_2—$,
$H_3CNH(CH_2)_3—$,
$C_2H_5NH(CH_2)_3—$,
$H_3CNH(CH_2)_2—$,
$C_2H_5NH(CH_2)_2—$,
$H_2N(CH_2)_4—$,
$H_2N(CH_2)_5—$,
$H(NHCH_2CH_2)_3—$,
$C_4H_9NH(CH_2)_2NH(CH_2)_2—$,
cyclo-$C_6H_{11}NH(CH_2)_3—$,
cyclo-$C_6H_{11}NH(CH_2)_2—$,
$(CH_3)_2N(CH_2)_3—$,
$(CH_3)_2N(CH_2)_2—$,
$(C_2H_5)_2N(CH_2)_3—$ and
$(C_2H_5)_2N(CH_2)_2—$.

Y is preferably $H_2N(CH_2)_3—$, $H_2N(CH_2)_2NH(CH_2)_3—$, $H_3CNH(CH_2)_3—$, $C_2H_5NH(CH_2)_3—$ and cyclo-$C_6H_{11}NH(CH_2)_3—$, with particular preference being given to $H_2N(CH_2)_2NH(CH_2)_3—$ and cyclo-$C_6H_{11}NH(CH_2)_3—$.

Where the organosilicon compounds comprising units of formula (IV) are silanes, b is preferably 0, 1 or 2, particularly preferably 0 or 1, c is preferably 1 or 2, particularly preferably 1, and d is preferably 1, 2 or 3, particularly preferably 2 or 3, with the proviso that the sum of b, c and d is equal to 4.

Examples of the silanes of the formula (IV) according to the invention are
$H_2N(CH_2)_3—Si(OCH_3)_3$
$H_2N(CH_2)_3—Si(OC_2H_5)_3$
$H_2N(CH_2)_3—Si(OCH_3)_2CH_3$
$H_2N(CH_2)_3—Si(OC_2H_5)_2CH_3$
$H_2N(CH_2)_3—Si(OH)_{3-x}(OM)_x$
$H_2N(CH_2)_3—Si(OH)_{2-y}(OM)_yCH_3$
$H_2N(CH_2)_2NH(CH_2)_3—Si(OCH_3)_3$
$H_2N(CH_2)_2NH(CH_2)_3—Si(OC_2H_5)_3$
$H_2N(CH_2)_2NH(CH_2)_3—Si(OCH_3)_2CH_3$
$H_2N(CH_2)_2NH(CH_2)_3—Si(OC_2H_5)_2CH_3$
$H_2N(CH_2)_2NH(CH_2)_3—Si(OH)_{3-x}(OM)_x$
$H_2N(CH_2)_2NH(CH_2)_3—Si(OH)_{2-y}(OM)_yCH_3$
cyclo-$C_6H_{11}NH(CH_2)_3—Si(OCH_3)_3$
cyclo-$C_6H_{11}NH(CH_2)_3—Si(OC_2H_5)_3$
cyclo-$C_6H_{11}NH(CH_2)_3—Si(OCH_3)_2CH_3$
cyclo-$C_6H_{11}NH(CH_2)_3—Si(OC_2H_5)_2CH_3$
cyclo-$C_6H_{11}NH(CH_2)_3—Si(OH)_{3-x}(OM)_x$ and
cyclo-$C_6H_{11}NH(CH_2)_3—Si(OH)_{2-y}(OM)_yCH_3$,
where
$H_2N(CH_2)_2NH(CH_2)_3—Si(OCH_3)_3$
$H_2N(CH_2)_2NH(CH_2)_3—Si(OC_2H_5)_3$
$H_2N(CH_2)_2NH(CH_2)_3—Si(OCH_3)_2CH_3$
$H_2N(CH_2)_2NH(CH_2)_3—Si(OC_2H_5)_2CH_3$
$H_2N(CH_2)_2NH(CH_2)_3—Si(OH)_{3-x}(ONa)_x$
$H_2N(CH_2)_2NH(CH_2)_3—Si(OH)_{2-y}(ONa)_yCH_3$
cyclo-$C_6H_{11}NH(CH_2)_3—Si(OCH_3)_3$
cyclo-$C_6H_{11}NH(CH_2)_3—Si(OC_2H_5)_3$
cyclo-$C_6H_{11}NH(CH_2)_3—Si(OCH_3)_2CH_3$
cyclo-$C_6H_{11}NH(CH_2)_3—Si(OC_2H_5)_2CH_3$
cyclo-$C_6H_{11}NH(CH_2)_3—Si(OH)_{3-x}(ONa)_x$ and
cyclo-$C_6H_{11}NH(CH_2)_3—Si(OH)_{2-y}(ONa)_yCH_3$ are preferred and
$H_2N(CH_2)_2NH(CH_2)_3—Si(OCH_3)_3$
$H_2N(CH_2)_2NH(CH_2)_3—Si(OCH_3)_2CH_3$
cyclo-$C_6H_{11}NH(CH_2)_3—Si(OCH_3)_3$
cyclo-$C_6H_{11}NH(CH_2)_3—Si(OCH_3)_2CH_3$
$H_2N(CH_2)_2NH(CH_2)_3—Si(OH)_{3-x}(ONa)_x$ and
$H_2N(CH_2)_2NH(CH_2)_3—Si(OH)_{2-y}(ONa)_yCH_3$ are particularly preferred, where x is 0, 1, 2 or 3, y is 0, 1 or 2 and M is the cation of sodium or potassium.

Silanes of the formula (IV) are commercially available products and can be prepared by the methods customary in silicon chemistry.

Where the organosilicon compound comprising units of the formula (IV) is an organopolysiloxane, the average value of b is preferably between 0.5 and 2.5, particularly preferably between 0.8 and 2.0, the average value of c is preferably between 0.01 and 1.5, particularly preferably between 0.01 and 1.0, and the average value of d is preferably between 0 and 2.0, particularly preferably between 0 and 0.2, with the proviso that the sum of b, c and d is less than or equal to 3.

The organopolysiloxanes employed in accordance with the invention, comprising units of the formula (IV), have a viscosity at 25° C. of preferably from 5 to $10^5$ mm$^2$/s, particularly preferably from 10 to $10^4$ mm$^2$/s.

Examples of the organopolysiloxanes employed according to the invention which comprise units of the formula (IV) are (IVa)
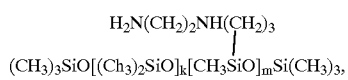
$(CH_3)_3SiO[(CH_3)_2SiO]_k[CH_3SiO]_mSi(CH_3)_3$, (IVa')
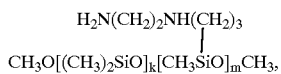
$CH_3O[(CH_3)_2SiO]_k[CH_3SiO]_mCH_3$, (IVa'')
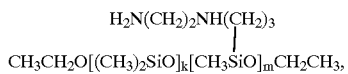
$CH_3CH_2O[(CH_3)_2SiO]_k[CH_3SiO]_mCH_2CH_3$, (IVb)
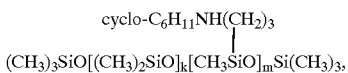
$(CH_3)_3SiO[(CH_3)_2SiO]_k[CH_3SiO]_mSi(CH_3)_3$, (IVb')
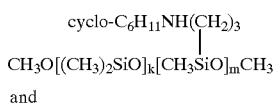
$CH_3O[(CH_3)_2SiO]_k[CH_3SiO]_mCH_3$
and (IVb'')
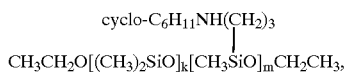
$CH_3CH_2O[(CH_3)_2SiO]_k[CH_3SiO]_mCH_2CH_3$, the ratio of k to m being in each case between 2:3 and 9:1 and the sum of k and m being between 10 and 1000, and also (IVc)
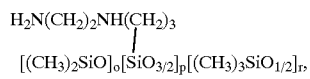
$[(CH_3)_2SiO]_o[SiO_{3/2}]_p[(CH_3)_3SiO_{1/2}]_r$, (IVc')
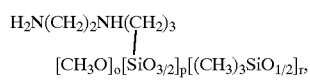
$[CH_3O]_o[SiO_{3/2}]_p[(CH_3)_3SiO_{1/2}]_r$, (IVc'')
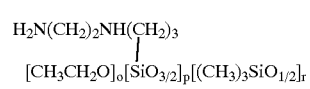
$[CH_3CH_2O]_o[SiO_{3/2}]_p[(CH_3)_3SiO_{1/2}]_r$
and (IVd)
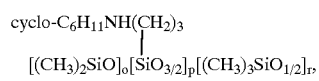
$[(CH_3)_2SiO]_o[SiO_{3/2}]_p[(CH_3)_3SiO_{1/2}]_r$, with the sum of o+p+r being between 10 and 1000, the ratio of o:(o+p+r) being between 0 and 0.9, in particular between 0.2 and 0.7, the ratio of p:(o+p+r) being between 0.05 and 0.6, in particular between 0.1 and 0.5, and the ratio of r:(o+p+r) being between 0.05 and 0.75, in particular between 0.2 and 0.6, and also (IVe)
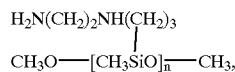
$CH_3O$—$[CH_3SiO]_n$—$CH_3$, n being between 5 and 100.

Organopolysiloxanes comprising units of the formula (IV) are commercially available products and can be prepared by methods which are customary in silicon chemistry.

As component (C) it is preferred to employ potassium N-(2-aminoethyl)-3-aminopropylmethylsilanolate, sodium N-(2-aminoethyl)-3-aminopropylmethylsilanolate, α,ω-dimethoxypoly(N-(2-aminoethyl)-3-aminopropylmethylsiloxane) and N-(2-aminoethyl)-3-aminopropylmethyldimethoxysilane.

The compound (C) containing basic nitrogen which is employed in accordance with the invention may comprise one single type or else a mixture of at least two types of such compounds.

For the preparation of the aqueous dispersions of organopolysiloxanes according to the invention, component (C) is employed in a quantity such that the content of basic nitrogen is preferably from 0.01 to 5 parts by weight, particularly preferably from 0.01 to 1 part by weight, in particular from 0.04 to 0.5 part by weight, based in each case on 100 parts by weight of organopolysiloxane (A) containing condensable groups.

The aqueous organopolysiloxane dispersions according to the invention are generally stabilized by means of emulsifiers (D). Cationic, nonionic, ampholytic and nonionic emulsifiers can be used. The person skilled in the art is sufficiently aware of these emulsifiers and the quantity in which they are added. It is possible to use one type of emulsifier, for example an anionic type, or else mixtures of at least two types of emulsifiers, for example a mixture of at least one anionic with at least one nonionic emulsifier.

The emulsifiers (D) can be added as such to the mixture to be dispersed or to the mixture which is to be stabilized as a dispersion, but can also be formed by chemical reaction(s) in the mixture to be dispersed or the mixture to be stabilized as a dispersion from a precursor, for example the corresponding acid, base or a salt of the actual emulsifier.

The anionic emulsifiers are preferably the salts of the surface-active sulfonic acids used in the course of the emulsion polymerization for forming the organopolysiloxane (A) containing condensable groups, these sulfonic acids being in accordance with U.S. Pat. No. 3,294,725 (D. E. Findley, Dow Corning Corporation; published on Dec. 27, 1966), which indicates the surface-active sulfonic acids and salts thereof. The alkali metal salts or ammonium salts of the sulfonic acids are preferred, especially the potassium salts.

Examples of the sulfonic acids are aliphatically substituted benzenesulfonic acids, aliphatically substituted naphthalenesulfonic acids, aliphatic sulfonic acids, silylalkylsulfonic acids and aliphatically substituted diphenyl ether sulfonic acids.

Other anionic emulsifiers which can be used are alkali metal sulforicinoleates, sulfonated glycerol esters of fatty acids, salts of sulfonated monovalent alcohol esters, amides of aminosulfonic acids, for example the sodium salt of oleylmethyl tauride, alkali metal salts of sulfonated aromatic hydrocarbons, such as sodium α-napthalenemonosulfonate, condensation products of naphthalenesulfonic acids with formaldehyde, and sulfates, such as ammonium lauryl sulfate, triethanolamine lauryl sulfate and sodium lauryl ether sulfate.

Nonionic emulsifiers are preferably used in addition to anionic emulsifier. Examples of such nonionic emulsifiers are saponines, addition products of fatty acids with ethylene oxide, such as dodecanoic esters with tetraethylene oxide, addition products of ethylene oxide with sorbitan trioleate, addition products of phenolic compounds having side chains with ethylene oxide, such as addition products of ethylene oxide with isododecylphenol, and imine derivatives, such as polymerized ethyleneimine, and addition products of alcohols with ethylene oxide, such as polyethylene glycol(10) isotridecyl ether.

Examples of cationic emulsifiers are salts of fatty amines, quaternary ammonium compounds, and quaternary compounds of pyridine, morpholine and imidazoline.

Examples of ampholytic emulsifiers are long-chain substituted amino acids, such as N-alkyldi(aminoethyl)glycine, N-alkyl 2-aminopropionate, and betaines, such as (3-acylaminopropyl)dimethylglycine and alkylimidazolium betaines.

In addition it is also possible to employ water-soluble polymers which are described in the literature as being suitable for the stabilization of dispersions, for instance polyvinyl alcohols, polyvinylpyrrolidones, polyvinyl sulfates, polyacrylates, polyacrylamides and malonic acid-styrene copolymers or else polysaccharides, all of which can be used as emulsifiers for preparing the dispersions according to the invention.

Where emulsifier (D) is employed, it preferably comprises anionic emulsifiers, nonionic emulsifiers and mixtures thereof, particularly preferably alkali metal salts of organic sulfonic acids, organopolyglycol ethers, and polyvinyl alcohols.

Emulsifier (D) is preferably employed in preparing the aqueous organopolysiloxane dispersions according to the invention.

The quantity of emulsifier which is advantageous for stabilizing the aqueous organopolysiloxane dispersions of the invention is heavily dependent on the composition of the respective dispersion. In general, from 0.5 to 10 parts by weight of emulsifier(s) are sufficient per 100 parts by weight of organopolysiloxane (A) containing condensable groups.

The aqueous organopolysiloxane dispersions according to the invention can also contain fillers (E)

Examples of fillers (E) are nonreinforcing fillers, i.e. fillers having a BET surface area of up to 50 $m^2/g$, such as quartz, diatomaceous earth, calcium silicate, zirconium silicate, zeolites, metal oxide powders, such as aluminum oxide, titanium oxides, iron oxides or zinc oxides and their mixed oxides, barium sulfate, calcium carbonate, gypsum, silicon nitride, silicon carbide, boron nitride, powdered glass and powdered plastics; reinforcing fillers, i.e. fillers having a BET surface area of more than 50 $m^2/g$, such as pyrogenically prepared silica, precipitated silica, carbon black, such as furnace black and acetylene black, and silicon-aluminum mixed oxides of large BET surface area; fibrous fillers, such as asbestos, and plastic fibers. The fillers specified can have been rendered hydrophobic, for example by treatment with organosilanes or organosiloxanes or by etherification of hydroxyl groups to alkoxy groups.

If fillers (E) are employed, the quantities involved are preferably from 0.1 to 200 parts by weight, particularly preferably from 0.5 to 100 parts by weight, based in each case on 100 parts by weight of organopolysiloxane (A) containing condensable groups. The quantity of filler (E) employed can be varied within wide ranges and depends in particular on the specific intended application of the dispersions according to the invention.

Furthermore, the aqueous organopolysiloxane dispersions of the invention can comprise additives (F), which are selected preferably from the group consisting of adhesion promoters, plasticizers, foam suppressants, thixotropic agents and dispersants, pigments, soluble dyes, fungicides, aroma substances and organic solvents which are inert with respect to the dispersions.

Examples of adhesion promoters, which are added in order to improve the adhesion of the elastomeric products, obtained from the novel aqueous dispersions after removal of their solvent content, to the substrate to which the novel dispersions have been applied, are amino-functional silanes, such as N-(2-aminoethyl)-3-aminopropyltrialkoxysilanes, in which the alkoxy radical is a methoxy, ethoxy, n-propoxy or isopropoxy radical.

Examples of plasticizers are dimethylpolysiloxanes which are terminally blocked by trimethylsiloxy groups, are liquid at room temperature and have a viscosity of at least 10 $mm^2/s$.

Examples of organic solvents which are inert with respect to the dispersions are hydrocarbons, such as petroleum ethers of various boiling ranges, n-pentane, n-hexane, hexane isomer mixture, toluene and xylene.

Examples of thixotropic agents are carboxymethylcellulose and polyvinyl alcohol.

Examples of dispersants are polyacrylic acid salts and polyphosphates.

The thixotropic agents and dispersants mentioned also have emulsifying properties in some cases, so that they can be used as emulsifiers.

From each of the groups of substances mentioned above as possible component for the aqueous dispersions according to the invention it is possible in each case for one component used to be a substance from this group or else a mixture of at least two different such substances.

The aqueous organopolysiloxane dispersions according to the invention preferably have pH values of from 5 to 13, particularly preferably from 6 to 11.

In the aqueous organopolysiloxane dispersions according to the invention, solids contents of up to 96 percent by weight may be achieved. Lower solids contents are of course possible. Even in the case of aqueous silicone dispersions according to the invention which do not contain fillers, a solids content of more than 90 percent by weight can be achieved. The solids content in this context is the proportion by weight of all of the constituents of the dispersion, with the exception of water and, if used, organic solvent, in the overall weight of the dispersion.

The aqueous organopolysiloxane dispersions according to the invention may be of coherent consistency or flowable, depending on the application.

Preferred organosiloxane dispersions according to the invention are those prepared exclusively using components (A), (B), (C), (D), water and, if desired, (E) and (F).

Particularly preferred organosiloxane dispersions according to the invention are those prepared exclusively using components (A), (B), (C), (D) and water, if desired, (E).

It is possible in principle to prepare the aqueous dispersions of the invention by any desired methods known to date.

From the composition according to the invention the aqueous dispersions of organopolysiloxanes there results, as a substantially simplified and therefore economic mode of preparation, a process (process 1) which comprises mixing together all of the constituents in the dispersion, except for filler (E), and dispersing them together. Thereafter, if desired, the filler (E) can be incorporated immediately into the dispersion.

According to another procedure (process 2), all of the constituents of the dispersion, except for component (C) and filler (E), are mixed with one another and dispersed together. Thereafter, component (C) and, if desired, filler (E) are incorporated into the dispersion.

The dispersions according to the invention are preferably prepared by process 2.

The emulsification or dispersion operation can be carried out in customary mixing equipment which is suitable for the preparation of emulsions or dispersions, for example high-speed stator-rotor stirrers according to Prof. P. Willems, known under the trade name "Ultra-Turrax". In this context reference is made also to Ullmanns Encyklopädie der Technischen Chemie [Ullmann's Encyclopedia of Industrial Chemistry], Urban & Schwarzenberg, Munich, Berlin, 3rd edition, Volume 1, page 720 ff.

The dispersion according to the invention can of course also be prepared in another way. However, it has been found that the procedure is critical and that not all types of preparation produce dispersions which lead to elastomers after removal of water.

The processes of the invention have the advantage that they are very simple to carry out and that it is possible to prepare aqueous dispersions having very high solids contents. A high solids content is the precondition for a low or insignificant degree of shrinkage on vulcanization, which is desirable for the majority of areas of application.

The processes of the invention also have the advantage that the individual constituents of the aqueous dispersion of organopolysiloxanes can be employed without pretreatment operations; in particular, there is no need for the operation, described frequently in the prior art, of condensing or polymerizing the polyorganosiloxane component prior to emulsification.

The processes of the invention therefore have the advantage that the aqueous dispersions can be prepared in a single operation, without waiting times for maturation during the preparation, which would complicate and slow down the preparation process.

The process according to the invention can be carried out discontinuously or else continuously.

The aqueous dispersions according to the invention have the advantage that they are free from organic transition metal compounds and organic compounds of the metals of main groups III, IV and V, with the result, inter alia, that the dispersions are of high stability on storage.

The aqueous dispersions according to the invention are preferably stable on storage at room temperature in the absence of air, under the pressure of the surrounding atmosphere, for a period of at least three years; in other words, when the unvulcanized dispersions are stored under the specified conditions for a relatively long period of at least three years, the properties both of the unvulcanized dispersions and of the elastomers which result therefrom after removal of the water are not altered or are altered only to an insignificant extent. In particular, the consistency of the aqueous dispersions, and the mechanical properties and adhesion properties of the elastomers obtained from the dispersions, are retained after prolonged storage of the unvulcanized dispersions in the absence of air and at room temperature.

The aqueous dispersions according to the invention and the elastomers which result therefrom have the advantage of being odorless and toxicologically unobjectionable.

The aqueous dispersions according to the invention have the advantage that the elastomers which result after removal of the water possess an absolutely dry and tack-free surface. Tacky vulcanizate surfaces, as frequently result from aqueous dispersions based on organopolysiloxane resins and based on acrylate, in fact show a tendency toward increased soiling, owing to the attachment of dirt particles such as, for instance, dust.

The aqueous organopolysiloxane dispersions according to the invention cure within a short time even at room temperature after evaporation of the solvent fraction, i.e. the water and, if used, organic solvent, to form elastomers.

The aqueous dispersions according to the invention, especially those prepared using polyvinyl alcohols, have the advantage that they cure in thin films to form transparent elastomers.

The aqueous organopolysiloxane dispersions according to the invention can be employed for all purposes for which aqueous organopolysiloxane dispersions have also been used hitherto. They can be employed, for example, as sealing compounds, paints, coating systems and as electrically insulating or conducting, hydrophobic coating systems which repel tacky substances, or as bases for or additives to such systems.

The aqueous dispersions according to the invention have the additional advantage that they form firmly adhering coatings on numerous substrates, examples being paper, textiles, mineral construction materials, plastics, wood and many other substrates. Coating in this context can be carried out, for example, by brushing, rolling, dipping or spraying.

A preferred area of application is the use as sealing compounds and coating materials. Examples which may be mentioned include joint-sealing compositions for facades and buildings, and window glazing, and their use as sealants in the sanitary sector. Examples of coatings include masonry coatings and impregnations, elastic masonry paints, and coatings on textiles and fabrics.

In the examples described below all parts and percentages are by weight unless specified otherwise. Furthermore, all viscosity data relate to a temperature of 25° C. Unless specified otherwise, the examples below are carried out at the pressure of the surrounding atmosphere, i.e. at about 1000 hPa, and at room temperature, i.e. at about 22° C., or at the temperature which results when the reactants are combined at room temperature without additional heating or cooling.

The amine number corresponds numerically to the value which indicates the consumption in ml of 1 N HCl for the neutralization of 1 g of amino-functional organosilicon compounds.

The elastomer properties are determined in each case in accordance with the following standardized tests:
Tear strength: DIN 53504-85S1
Elongation at break: DIN 53504-85S1
Modulus: DIN 53504-85S1
Shore A hardness: DIN 53505-87
Tear propagation strength: ASTM D624B-73
The following abbreviations are used:
Me: methyl radical
Et: ethyl radical
Pr: propyl radical
Bu: butyl radical
Vi: vinyl radical
Ac: acetyl radical
Ph: phenyl radical

EXAMPLE 1

500 g of α,ω-dihydroxypolydimethylsiloxane having a viscosity of 80,000 mm$^2$/s, 5 g of ViSi(OMe)$_3$ and 5 g of α,ω-dimethoxypoly(N-2-aminoethyl)-3-aminopropylmethylsiloxane) having a viscosity of 4000 mm$^2$/s and an amine number of 12 are mixed together with 30 g of a 75% strength aqueous sodium dodecylbenzene-sulfonate solution (commercially available under the name "Marlon A 375" from Hüls AG) and 75 g of water, and the mixture is converted into a dispersion with the aid of an Ultra-Turrax mixer. The addition of 345 g of precipitated chalk gives a creamy soft, smooth, permanently homogeneous mass of firm consistency with a solids content of 91% and a pH of 10, which is dispensed under airtight conditions into cartridges. The properties of the dispersion thus stored are unchanged over a period of over 1 year.

Films 2 mm thick are produced from the resulting dispersion of organopolysiloxanes by applying the aqueous dispersion to a polytetrafluoroethylene (PTFE) surface and allowing the water to evaporate at room temperature. The dry elastic films which form are investigated two weeks after application for their elastomer properties. Data on the elastomer properties can be found in Table 1.

EXAMPLE 2

The procedure described in Example 1 is repeated with the modification that, instead of the 5 g of ViSi(OMe)$_3$, the organosilicon compounds specified in Table 2 are employed, in each case in different batches:

TABLE 2

| Example | Organosilicon compound employed |
|---|---|
| 2a) | 5 g of ViSi (OEt)$_3$ |
| 2b) | 5 g of MeSi (OMe)$_3$ |
| 2c) | 5 g of PhSi (OMe)$_3$ |
| 2d) | 5 g of a partial hydrolyzate mixture of Si(OEt)$_4$ comprising 10 mol % monomer, 34 mol % (EtO)$_3$SiO$_{1/2}$ units, 38 mol % (EtO)$_2$SiO units and 18 mol % EtOSiO$_{3/2}$ units |
| 2e) | 5 g of H$_2$C=CMe-COO—(CH$_2$)$_3$Si(OMe)$_3$ |

After adding 345 g of precipitated chalk to each of the above batches a) to e), in each case a creamy soft, smooth, permanently homogeneous composition is obtained which is of firm consistency and has a solids content of about 91% and a pH of about 10, and is dispensed under airtight conditions into cartridges. The properties of one of the dispersions stored in this way are unchanged over a period of more than 1 year.

Films 2 mm thick are produced from each of the resulting dispersions of organopolysiloxanes by applying the aqueous dispersion to a polytetrafluoroethylene (PTFE) surface and allowing the water to evaporate at room temperature. The dry elastic films which form are investigated two weeks after application for their elastomer properties. Data on the elastomer properties can be found in Table 1.

EXAMPLE 3

The procedure described in Example 1 is repeated with the modification that, instead of the 30 g of a 75% strength aqueous sodium dodecylbenzenesulfonate solution, the compounds or mixtures specified in Table 3 are employed, in each case in different batches:

TABLE 3

| Example | compounds or mixtures employed |
|---|---|
| 3a) | 30 g of a 1:1 mixture of a 75% strength aqueous sodium dodecylbenzenesulfonate solution and an 80% strength aqueous solution of polyethylene glycol(10) isotridecyl ether (commercially available under the name "Arlypon IT 10" from Grünau) |
| 3b) | 30 g of an 80% strength aqueous solution of polyethylene glycol(10) isotridecyl ether |

TABLE 3-continued

| Example | compounds or mixtures employed |
|---|---|
| 3c) | 30 g of a 3:1 by weight mixture of nonylphenol polyethylene glycol(15) ether (commercially available under the name "Arkopal N-150" from Hoechst AG) and nonylphenol polyethylene glycol(5) ether (commercially available under the name "Arkopal N-050" from Hoechst AG) |

After adding 345 g of precipitated chalk to each of the above batches a) to c), in each case a creamy soft, smooth, permanently homogeneous composition is obtained which is of firm consistency and has a solids content of about 91% and a pH of about 10, and is dispensed under airtight conditions into cartridges. The properties of one of the dispersions stored in this way are unchanged over a period of more than 1 year.

Films 2 mm thick are produced from the resulting dispersion of organopolysiloxanes by applying the aqueous dispersion to a polytetrafluoroethylene (PTFE) surface and allowing the water to evaporate at room temperature. The dry elastic films which form are investigated two weeks after application for their elastomer properties. Data on the elastomer properties can be found in Table 1.

EXAMPLE 4

200 g of α,ω-dihydroxypolydimethylsiloxane having a viscosity of 80,000 mm$^2$/s, 5 g of ViSi(OMe)$_3$ and 10 g of 3-(2-aminoethylamino)propyl-functional polydimethylsiloxane having a viscosity of 1000 mm$^2$/s and an amine number of 0.3 (commercially available under the name "Finish WR 1300" from Wacker-Chemie GmbH) are mixed together with 2 g of α,ω-dimethoxypoly(N-(2-aminoethyl)-3-aminopropylmethylsiloxane) having a viscosity of 4000 mm$^2$/s and an amine number of 12, 20 g of water and 50 g of a 10% strength aqueous solution of polyvinyl alcohol having a molecular weight of 85,000 g/mol and a hydrolysis number of 240 (commercially available under the trade name "Polyviol" W 30/240 from Wacker-Chemie GmbH) and the mixture is converted into a dispersion with the aid of an Ultra-Turrax mixer. This gives a white, creamy soft, smooth, permanently homogeneous mass of firm consistency with a solids content of 84% and a pH of 7.5, which is dispensed under airtight conditions into cartridges. The properties of the dispersion thus stored are unchanged over a period of over 1 year. The vulcanized product is transparent.

Films 2 mm thick are produced from the resulting dispersion of organopolysiloxanes by applying the aqueous dispersion to a polytetrafluoroethylene (PTFE) surface and allowing the water to evaporate at room temperature. The dry elastic films which form are investigated two weeks after application for their elastomer properties. Data on the elastomer properties can be found in Table 1.

EXAMPLE 5

The procedure described in Example 1 is repeated with the modification that, instead of the 5 g of α,ω-dimethoxypoly(N-(2-aminoethyl)-3-aminopropylmethylsiloxane), the organosilicon compounds containing basic nitrogen specified in Table 4 are employed, in each case in different batches:

TABLE 4

| Example | Organosilicon compound containing basic nitrogen employed |
|---------|-----------------------------------------------------------|
| 5a) | 5 g of a 50% strength aqueous solution of potassium N-(2-aminoethyl)-3-aminopropyl methylsilanolate (prepared in accordance with the initially cited German Application P 43 40 400.6) |
| 5b) | 5 g of N-(2-aminoethyl)-3-aminopropyl-methyldimethoxysilane (commercially available under the name "Silan GF 95" from Wacker-Chemie GmbH) |
| 5c) | 5 g of N-(2-aminoethyl)-3-aminopropyltrimethoxysilane (commercially available under the name "Silan GF 91" from Wacker-Chemie GmbH) |
| 5d) | 15 g of a trimethylsiloxy-terminated silicone oil consisting of dimethylsiloxy and aminopropylmethylsiloxy units, having a viscosity of 30 mm$^2$/s and an amine number of 2.5 |

After adding 345 g of precipitated chalk to each of the above batches a) to d), in each case a creamy white, smooth, permanently homogenous composition is obtained which is of firm consistency and has a solids content of about 91% and a pH of about 10, which is dispensed under airtight conditions into cartridges. The properties of each of the dispersions stored in this way are unchanged over a period of more than 1 year.

Films 2 mm thick are produced from each of the resulting dispersions of organopolysiloxanes by applying the aqueous dispersion to a polytetrafluoroethylene (PTFE) surface and allowing the water to evaporate at room temperature. The dry elastic films which form are investigated two weeks after application for their elastomer properties. Data on the elastomer properties can be found in Table 1.

COMPARISON EXAMPLE 1

The procedure described in Example 1 is repeated with the modification that, instead of 5 g of α,ω-dimethoxypoly(N-(2-aminoethyl)-3-aminopropylmethylsiloxane), the basic compounds indicated in Table 5 are employed, in each case in different batches:

TABLE 5

| Comparison Example | basic compound employed |
|--------------------|--------------------------|
| CE1a) | 5 g of 2-amino-2-methylpropanol |
| CE1b) | 5 g of 2-aminoethanol |
| CE1c) | 5 g of ethylenediamine |
| CE1d) | 5 g of hexylamine |
| CE1e) | 5 g of 50% strength aqueous KOH |
| CE1f) | 5 g of guanidine carbonate |

The addition of 345 g of precipitated chalk to each of the above batches CE1a) to CE1f) produces in each case a creamy soft, homogeneous mass of firm consistency with a solids content of 91% and a pH of about 10, which is dispensed under airtight conditions into cartridges.

The dispersions from Comparison Examples CE1a, CE1d, CE1e and CE1f go stiff in the cartridge within three days, i.e. the dispersion becomes inhomogeneous and breaks down, and unwanted elastic components are formed in the cartridge itself. The dispersions are unusable. It is therefore no longer possible to produce films of these compositions for mechanical testing.

Films 2 mm thick are produced from each of the dispersions of organopolysiloxanes of batches CE1b and CE1c by applying the aqueous dispersion to a polytetrafluoroethylene (PTFE) surface and allowing the water to evaporate at room temperature. Even after a period of more than one month, no elastic films suitable for measurement are formed.

EXAMPLE 6

The procedure described in Example 1 is repeated with the modification that 800 g instead of 345 g of precipitated chalk are employed. The creamy, homogeneous mass of firm consistency which is obtained has a pH of 10 and a solids content of 95.6%.

A film 2 mm thick is produced from the resulting dispersion of organopolysiloxanes, by applying the aqueous dispersion to a polytetrafluoroethylene (PTFE) surface and allowing the water to evaporate at room temperature. The dry elastic film which forms is investigated two weeks after application for its elastomer properties. Data on the elastomer properties can be found in Table 1.

TABLE 1

| Test | Tear strength (N/mm$^2$) | Elongation at break (%) | Modulus[1] (N/mm$^2$) | Shore A hardness | Tear propagation strength N/mm |
|------|---------------------------|--------------------------|----------------------|------------------|--------------------------------|
| 1 | 0.4 | 930 | 0.1 | 11 | 3.4 |
| 2a) | 0.4 | 1240 | 0.1 | 9 | 3.5 |
| 2b) | 0.2 | 320 | 0.1 | 5 | 1.2 |
| 2c) | 0.5 | 1570 | 0.1 | 6 | 2.7 |
| 2d) | 0.5 | 990 | 0.1 | 6 | 3.8 |
| 2e) | 0.4 | 1090 | 0.1 | 6 | 3.6 |
| 3a) | 0.5 | 710 | 0.2 | 14 | 4.0 |
| 3b) | 0.7 | 530 | 0.2 | 17 | 4.3 |
| 3c) | 0.6 | 470 | 0.2 | 12 | 3.5 |
| 4 | 0.5 | 320 | 0.3 | 15 | 3.9 |
| 5a) | 0.5 | 1290 | 0.1 | 12 | 2.7 |
| 5b) | 0.5 | 930 | 0.2 | 12 | 3.3 |
| 5c) | 0.4 | 790 | 0.1 | 8 | 3.0 |
| 5d) | 0.3 | 810 | 0.1 | 7 | 2.9 |
| CE1a) | goes stiff in the cartridge | | | | |
| CE1b) | no vulcanization | | | | |
| CE1c) | no vulcanization | | | | |
| CE1d) | goes stiff in the cartridge | | | | |
| CE1e) | goes stiff in the cartridge | | | | |
| CE1f) | goes stiff in the cartridge | | | | |
| 6 | 0.6 | 370 | 0.4 | 23 | 5.3 |

[1]Tensile strength at 100% elongation

We claim:

1. An aqueous RTV dispersion of organopolysiloxanes, which is free from organic transition metal compounds and organic compounds of metals or main groups III, IV and V of the periodic table, comprising:

(A) one or more organopolysiloxanes containing condensable groups, of the formula $$\text{HO-[SiR}^1{}_2\text{O]}_n\text{-H} \quad \text{(I),}$$

in which
each $R^1$ is an identical or different SiC-bonded hydrocarbon radical having 1 to 18 carbon atoms which is optionally substituted with halogen atoms, ether groups, ester groups, epoxy groups, mercapto groups, cyano groups or (poly)glycol radicals, said (poly)glycol radicals being comprised of oxyethylene units, oxypropylene units, or mixtures thereof, and
n is an integer of at least 30;

(B) from 0.01 to 20 parts by weight, based on 100 parts by weight of organopolysiloxane (A) containing condensable groups, of organosilicon compounds of the formula $$\{[(RO)_3Si-R^3-]_eR^2{}_{1-e}\}_aSi(OR)_{4-a} \quad \text{(II),}$$

in which
- each R is identical or different and is a hydrogen atom or alkyl radical having 1 to 6 carbon atoms,
- each $R^2$ is identical or different and is an SiC-bonded hydrocarbon radical having 1 to 18 carbon atoms which is optionally substituted with halogen atoms, ether groups, ester groups, epoxy groups, mercapto groups, cyano groups or (poly)glycol radicals, said (poly)glycol radicals defined above,
- each $R^3$ is identical or different and is a divalent hydrocarbon radical,
- a is 0 or 1 and
- e is 0 or 1, and/or partial hydrolyzates thereof having not more than 8 Si atoms;

(C) organosilicon compound containing basic nitrogen comprising units of the formula $$R^4_b Y_c Si(OR^5)_d O_{\frac{4-b-c-d}{2}}, \quad (IV)$$

in which
- each $R^4$ is identical or different and is a monovalent, SiC-bonded organic radical which is free from basic nitrogen,
- each $R^5$ is identical or different and is a hydrogen atom, alkyl radical, alkali metal cation, ammonium or phosphonium group,
- each Y is identical or different and is a monovalent, SiC-bonded radical containing basic nitrogen,
- b is 0, 1, 2 or 3,
- c is 0, 1, 2, 3 or 4 and
- d is 0, 1, 2, or 3, with the proviso that the sum of b, c and d is less than or equal to 4, at lest one radical Y is present per molecule, and component (C) is employed in a quantity such that the content of basic nitrogen is from 0.01 to 5 parts by weight based on 100 parts by weight of organopolysiloxane (A) containing condensable groups; and (D) one or more surfactants selected from the group consisting of anionic emulsifiers, nonionic emulsifiers, and mixtures thereof, said surfactants present in quantities of from 0.5 to 10 parts by weight based on 100 parts by weight of organopolysiloxane (A) containing condensable groups.

2. The aqueous dispersion as claimed in claim 1, wherein radicals $R^2$ individually comprise methyl, ethyl, vinyl or phenyl radicals.

3. A process for the preparation of an aqueous dispersion of organopolysiloxanes as claimed in claim 1, which comprises mixing with one another
a) one or more
- (A) organopolysiloxanes containing condensable groups,
- (B) organosilicon compounds of the formula (II) and (D) emulsifier, and, if desired, (F) additives, and
b) dispersing the mixture, followed by
c) incorporating (C) compounds containing basic nitrogen, and optionally, (E) filler.

4. A process for the preparation of an aqueous dispersion of organopolysiloxanes as claimed in claim 2, which comprises mixing with one another
a) one or more
- (A) organopolysiloxanes containing condensable groups,
- (B) organosilicon compounds of the formula (II) and (D) emulsifier, and, if desired, (F) additives, and
b) dispersing the mixture, followed by
c) incorporating (C) compounds containing basic nitrogen, and optionally, (E) filler.

5. A process for preparing an elastomer from an aqueous dispersion as claimed in claim 1, by removing water.

6. A process for preparing an elastomer from an aqueous dispersion as claimed in claim 2, by removing water.

7. A process for preparing an elastomer from an aqueous dispersion as prepared by the process of claim 3, by removing water.

8. A process for preparing an elastomer from an aqueous dispersion as prepared by the process of claim 4, by removing water.

9. A sealing or coating composition comprising an elastomer prepared from the composition of claim 1.

10. The composition of claim 1, further comprising from 0.1 weight percent to about 200 weight percent, based on the weight of the organopolysiloxanes containing condensable groups (A), of a non-reinforcing filler having a BET surface area of 50 m²/g or less.

11. The composition of claim 2 further comprising from 0.1 weight percent to about 200 weight percent, based on the weight of the organopolysiloxanes containing condensable groups (A), of a non-reinforcing filler having a BET surface area of 50 m²/g or less.

12. The composition of claim 1, further comprising from 0.5 weight percent to about 100 weight percent, based on the weight of the organopolysiloxanes containing condensable groups (A), of a non-reinforcing filler having a BET surface area of 50 m²/g or less.

13. The composition of claim 2, further comprising from 0.5 weight percent to about 100 weight percent, based on the weight of the organopolysiloxanes containing condensable groups (A), of a non-reinforcing filler having a BET surface area of 50 m²/g or less.

14. The composition of claim 1 wherein component (D) supplies from 0.04 to 0.5 parts by weight basic nitrogen based on 100 parts of organopolysiloxane (A).

15. The composition of claim 2 wherein component (D) supplies from 0.04 to 0.5 parts by weight basic nitrogen based on 100 parts of organopolysiloxane (A).

16. The composition of claim 10 wherein component (D) supplies from 0.04 to 0.5 parts by weight basic nitrogen based on 100 parts of organopolysiloxane (A).

* * * * *